(12) United States Patent
Kirchhoffer

(10) Patent No.: US 9,631,680 B2
(45) Date of Patent: Apr. 25, 2017

(54) INTEGRATED COOLING SYSTEM FOR A DRY DUAL CLUTCH OF A DUAL CLUTCH TRANSMISSION

(71) Applicant: FORD GLOBAL TECHNOLOGIES, LLC, Dearborn, MI (US)

(72) Inventor: Johann Kirchhoffer, Köln (DE)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 107 days.

(21) Appl. No.: 14/440,709

(22) PCT Filed: Jan. 29, 2014

(86) PCT No.: PCT/EP2014/051716
§ 371 (c)(1),
(2) Date: May 5, 2015

(87) PCT Pub. No.: WO2014/118228
PCT Pub. Date: Aug. 7, 2014

(65) Prior Publication Data
US 2015/0300420 A1    Oct. 22, 2015

(30) Foreign Application Priority Data
Jan. 29, 2013   (DE) .................. 10 2013 201 423

(51) Int. Cl.
*F16D 13/72*        (2006.01)
*F16D 21/06*        (2006.01)

(52) U.S. Cl.
CPC ............. *F16D 13/72* (2013.01); *F16D 21/06* (2013.01); *F16D 2021/0615* (2013.01); *F16D 2300/0212* (2013.01)

(58) Field of Classification Search
CPC ............. F16D 13/72; F16D 2021/0615; F16D 2300/0212; F16D 13/70; F16D 21/06; F16D 2021/0684
See application file for complete search history.

(56) References Cited

U.S. PATENT DOCUMENTS

| 6,568,518 B2 * | 5/2003 | Sarar ................. F16D 13/72 192/113.23 |
| 2012/0080287 A1 * | 4/2012 | Brevick ............. F16D 13/64 192/30 R |
| 2012/0123635 A1 | 5/2012 | Brevick et al. |

FOREIGN PATENT DOCUMENTS

| DE | 102008033813 A1 | 1/2010 |
| DE | 102010007198 A1 | 12/2010 |

* cited by examiner

Primary Examiner — Ramya Burgess
Assistant Examiner — Lillian Nguyen
(74) Attorney, Agent, or Firm — James Dottavio; MacMillan, Sobanski & Todd, LLC (57) ABSTRACT

A dual clutch transmission for motor vehicles, has two transmission sections, a dry dual clutch (1), which transmits the torque from the engine selectively to one of the two transmission sections, and a cooling system having a fan impeller system for active air cooling of the dual clutch (1). To optimize the individual functional parts of the cooling system and to reduce the clutch masses, it is proposed that the central disk (3) and/or at least one contact pressure plate (4, 5) is/are designed as a fan impeller of the fan impeller system (21). The central disk (3) and/or at least one of the contact pressure plates (4, 5) has/have passages which extend radially or have a radial component.

14 Claims, 11 Drawing Sheets

INTEGRATED COOLING SYSTEM FOR A DRY DUAL CLUTCH OF A DUAL CLUTCH TRANSMISSION

The invention relates to a dual clutch transmission for motor vehicles, having two transmission sections, a dry dual clutch, which transmits the torque from the engine selectively to one of the two transmission sections, and a cooling system having a fan impeller system for active air cooling of the dual clutch.

The invention can also be used with manually shifted transmissions and automated shift transmissions having a single clutch.

Dual clutch transmissions are automatic shift transmissions which allow a fully automatic gear change by means of two transmission sections without an interruption in power. The transmission controller selects the gears automatically or according to the driver's wishes within the framework of the permitted engine speed ranges. Transmission of the torque is accomplished via one of the two clutches which connect the two transmission sections to the engine. While one clutch is closing, the other opens.

Dry dual clutches of this kind often suffer from inadequate cooling or from overheating. This is problematic, especially with small engines, in the case of which there is a need for frequent shifting and the clutch disks are subject to high frictional stress, especially when starting off or during stop and go operation.

In parallel with the overheating, the use of specific friction linings may lead to the occurrence of troublesome clutch odors, which may enter the passenger compartment and lead to annoyance of the occupants. Another consequence of overheating is severe variance in the friction coefficient over the clutch temperature, leading to starting grab and unpleasant shifting jolts.

Moreover, sufficient cooling mass must be made available at the clutch elements for the dry clutches in order to avoid overheating of the clutch surfaces. As a result, however, it is necessary to accept the disadvantage that the clutch masses must be accelerated or decelerated during each shift, namely when driving off and accelerating and during each braking operation. This impairs the overall efficiency of the transmission and the dynamism of shifting and driving off.

To solve this problem, there has already been a proposal in DE 10 2011 087 458.5 to actively cool the clutch. To produce the cooling air flow use is made here of a fan impeller which is seated within the driving disk or within the central disk. In this proposed version, however, only the outer surroundings of the starting clutch are cooled. With a cooling system of this kind, it is not possible to produce the required cooling capacity from the frictional surface combined with high slip speeds. As before, there is the risk here of surface overheating and a resulting loss of clutch capacity and frictional loss or resultant "clutch fading".

DE 102 25 807 discloses a manual clutch which, on the one hand, provides a pressure plate having internal bracing elements but, on the other hand, does not simultaneously include the central plate in this concept. The bracing elements are used primarily to improve the elasticity of the pressure plate and to ensure that the pressure plate hugs the friction element more effectively, while cooling of the system occurs purely as a side effect.

DE 198 58 260 C2 discloses a central plate consisting of two disks, wherein axial distance pieces and spacers are provided between the disks. The air flow passing through is controlled by means of the rotational speed by additionally fitting guide elements at the outlet of the distance pieces. Such a system has the decisive disadvantage that the air flow cannot be controlled in an optimum manner. It is furthermore disadvantageous that the central plate consists of a plurality of individual parts, as a result of which there is, in turn, a negative effect on thermal conductivity.

U.S. Pat. No. 5,857,547 discloses a clutch having a pressure plate which has a rib system on the active contact side. This rib system brings about additional cooling of the pressure plate. In this system, however, the central disk is not included in the cooling system. The ribs are of straight-lined configuration on the pressure plate, thereby excluding variable convection across the contact pressure surface. Moreover, no additional disk is provided on the contact pressure side of the pressure plate, as a result of which the stiffness of the pressure plate is reduced and the overall contact surface of the pressure plate relative to the friction element is reduced. At the same time, the occurrence of partial overheating is thereby promoted. There is furthermore the risk that the pressure plate mass required to absorb the basic heat will not be reached.

The known systems mentioned have in common the disadvantage that they are not capable of cooling a dual clutch system having a central disk and two contact pressure plates sufficiently at the contact surface.

It is therefore the underlying object of the invention to provide a cooling system for a dry dual clutch in which all the functional parts of the cooling system are equipped in an optimum way while, at the same time, there should be the possibility of considerably reducing the clutch masses.

According to the invention, this object is achieved by virtue of the fact that the central disk and/or at least one of the contact pressure plates is/are designed as a fan impeller of the fan impeller system.

In a dual clutch, the central disk is subject to energy inputs from both sides, this occurring especially during frequent shifting in town traffic. In this case, variable cooling must be provided for the central disk and for the two contact pressure plates in order to be able to carry the overall energy out of the system.

The following features preferably form the basis for this:
1) a sufficiently large mass to absorb frictional energy;
2) a homogeneous structure to ensure resistance-free heat conduction,
3) an appropriately adapted geometry within the central disk and the contact pressure plates in order to release the heat from the system to the ambient air by convection as an inner cooling system;
4) control of the convection by way of the engine speed and of the inner cooling system; and
5) an outer cooling system, which ensures a low inlet temperature of the cooling air flow to the central disk and contact pressure plates relative to the outlet temperature.

By means of the fan impeller system according to the invention, which is arranged embedded within the central disk and/or within the two contact pressure plates, the cooling system within the clutch is given an optimum configuration. It represents a significant part of the inner cooling system.

In this context, the invention includes the combination of the following fan impeller systems:
1) only in the central disk
2) only in the first contact pressure plate
3) only in the second contact pressure plate
4) only in the two contact pressure plates
5) only in the central disk and the first contact pressure plate 6) only in the central disk and the second contact pressure plate 7) in the central disk and in both contact pressure plates All the abovementioned fan impeller systems rotate with the input shaft coming from the engine or with the driving disk seated on the input shaft, thus allowing the cooling air flow produced by the fan impeller system to be passed through the entire housing of the dual clutch and additionally to carry away the heat produced at the friction points between the central disk and the contact pressure plates. This is accomplished in an optimum manner especially when the fan impellers are equipped with a homogeneous heat transfer element, e.g. in the form of a homogeneous casting, and, at the same time, they do not fall below a certain heat storage capacity or cooling mass.

By virtue of the features according to the invention, not only is continuous cooling possible but also a significant reduction in the clutch masses.

The fan impeller system preferably rotates at the same speed as the dual clutch input shaft coming from the engine or as the dual clutch driving disk seated on the input shaft. A design of this kind can be achieved by simple technical means since the fan impeller system has merely to be mounted on the engine output shaft or is coupled to the latter. In this case, the fan impeller system can rotate with the dual clutch central disk connected to the engine output shaft or driving disk or with the contact pressure plates of the dual clutch. In this context, it is important that the fan impeller system guides the cooling air flow along parallel to the contact points between the central disk and the contact pressure plates and thus optimizes the cooling, which is affected by the respective engine speed.

It is furthermore a significant feature of the invention that the central disk and/or at least one of the contact pressure plates has/have internal passages extending at least partially radially to form a fan impeller for driving the cooling air flow.

In this case, it is expedient if the passages extend radially or have at least a radial component, ensuring that the cooling air is distributed internally to the entire surface of the central disk or of the contact pressure plates.

The passages in the central disk and/or at least in one of the contact pressure plates can further include apertures in the friction surface.

The fan impellers embedded in the central disk and in the contact pressure plates are preferably formed integrally with the central disk or the respective contact pressure plate, ensuring that no heat transfer resistances can arise.

In order to be able to control the cooling air in an optimum manner, the fan impellers provided in the central disk and/or in the contact pressure plates can be provided with fan blades which have adjustable entry angles and exit angles for adaptation of the air flow speed and direction. In this way, optimum cooling air distribution to all regions of the central disk or contact pressure plates is accomplished.

To increase the cooling surface area of the central disk and of the contact pressure plates, cooling islands can be provided between the fan blades.

Moreover, transverse cooling openings are expediently provided between the fan blades in order to increase the cooling surface area.

The fan impeller system draws in the cooling air from outside the clutch housing. Thus, the inlet region for the cooling air into the clutch housing should expediently be situated ahead of the respective fan impeller in the flow direction. However, it is also possible, in addition, for one to be provided in the driving disk or on the central plate or on both in order to increase the inlet speed of the cooling air flow into the fan impellers and hence to increase the cooling air throughput.

Since the cooling air flow is supposed to reach the entire housing of the dual clutch, the outlet region for the cooling air is preferably situated at the opposite end of the clutch housing from the inlet region. The intervening regions are expediently provided with corresponding passages.

To ensure that the cooling air is at a sufficiently low temperature, the inlet and outlet regions for the cooling air can be connected by a conduit system to the front radiator of the vehicle. Here, this represents a significant component of the outer cooling system. This also ensures that the cooling air is very largely dry since the air drawn in must on no account contain water.

As an option or in addition, a fan impeller integrated into the driving disk can be provided in order to increase the air throughput via the outer cooling system and to reduce the temperature in the clutch housing.

As an option, this outer cooling system can also be electronically controlled if the integrated fan impeller in the driving disk is retained and the clutch housing air temperature is achieved by means of electronic control of the air flow by means of an electronic air flap control system and/or the integrated fan impeller in the driving disk is replaced by air passage openings and an additional electrically driven pump system is introduced in order in this way to control the air temperature in the clutch housing by means of air flow control.

In order to keep the cooling air clean, air filters can be arranged in the cooling air flow in the inlet region and outlet region of the clutch housing.

The invention is illustrated by way of example in the drawing and described in detail below with reference to the drawing, in which.

Figure 1:
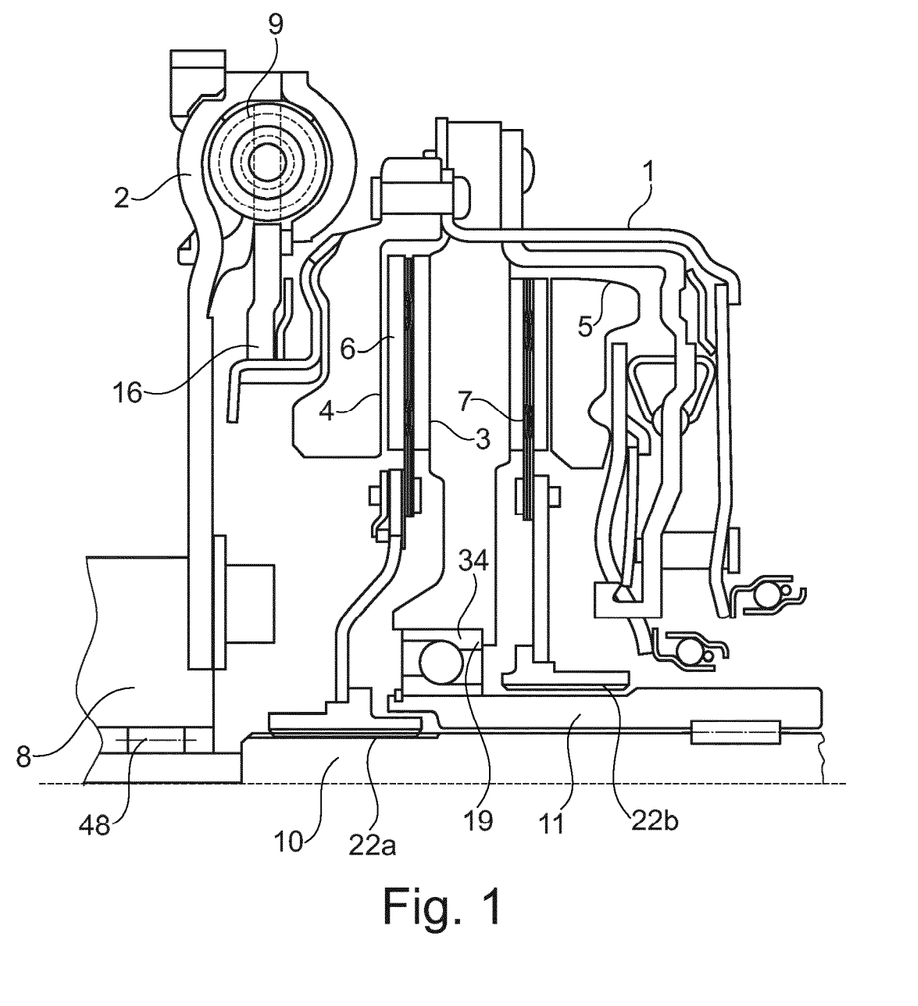
FIG. 1: shows a section through the upper part of a first illustrative embodiment of a dual clutch.

According to FIG. 1 of the drawing, the dual clutch 1 essentially comprises a driving disk 2, a central disk 3 connected thereto, contact pressure plates 4 and 5 provided on both sides of the central disk 3, and friction disks 6 and 7 arranged between the central disk 3 and the contact pressure plates 4 and 5.

The driving disk 2 is seated for conjoint rotation on the input shaft 8 of the dual clutch 1 and consequently rotates with the latter at the same speed of rotation. The input shaft 8 is normally the output shaft or crankshaft of an engine (not shown in the drawing).

The driving disk 2 is connected to the central disk 3 via a torsional damper 9 and a secondary disk 16, i.e. the central disk 3 revolves at the same speed as the driving disk 2. The contact pressure plates 4 and 5 arranged on both sides of the central disk 3 revolve with the central disk 3 but can be moved axially relative to the central disk 3. The entire unit of the dual clutch 1 with the central disk 3 and the two contact pressure plates 4 and 5 is supported on a hollow shaft bearing 19. A first output shaft designed as a hollow shaft 11, on which the hollow shaft bearing 19 is arranged, is, in turn, supported together with the entire system of the dual clutch 1 on the input shaft 8 via a second output shaft designed as a solid shaft 10 and a pilot bearing 48.

To initiate the clutch operation, one of the contact pressure plates 4 or 5 is moved in a direction toward the central disk 3, thereby pressing the respective friction disk 6 or 7 firmly against the central disk 3.

Owing to the coupling of the respective friction disk 6 or 7, said disk rotates with the central disk 3 and transmits the torque of the engine to the respective output shaft 10 or 11 of the dual clutch 1.

Output shaft 10, which is connected by splines 22*a* to friction disk 6, shown on the left in the drawing, and is designed as a solid shaft, issues into a transmission housing (not shown in the drawing), where it serves to drive a first transmission section. This transmission section operates gears 1, 3 and 5, for example.

Output shaft 11, which is connected by splines 22*b* to friction disk 7, shown on the right in the drawing, and is designed as a hollow shaft, surrounds the solid shaft 10. The hollow shaft 11 likewise leads into the transmission housing (not shown in the drawing) and serves to drive a second transmission section, which is provided for gears 2, 4 and 6 and reverse gear R, for example.

Figure 6:
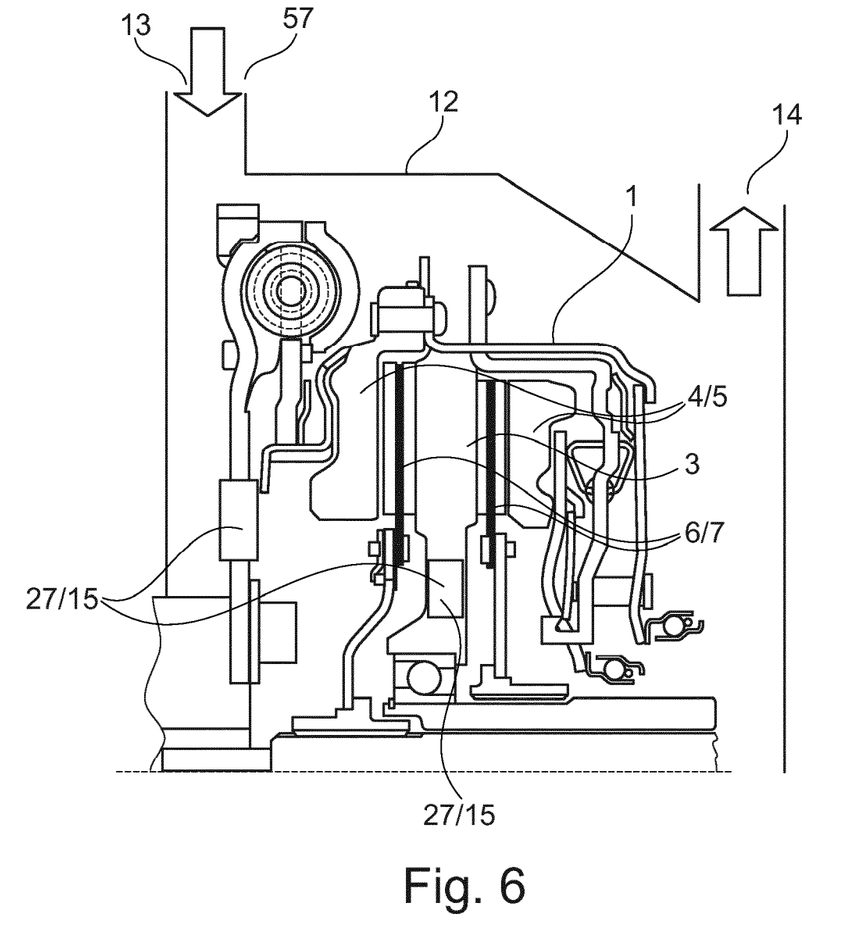
FIG. 6: shows the air passage system of the first illustrative embodiment of the dual clutch.
Figure 7:
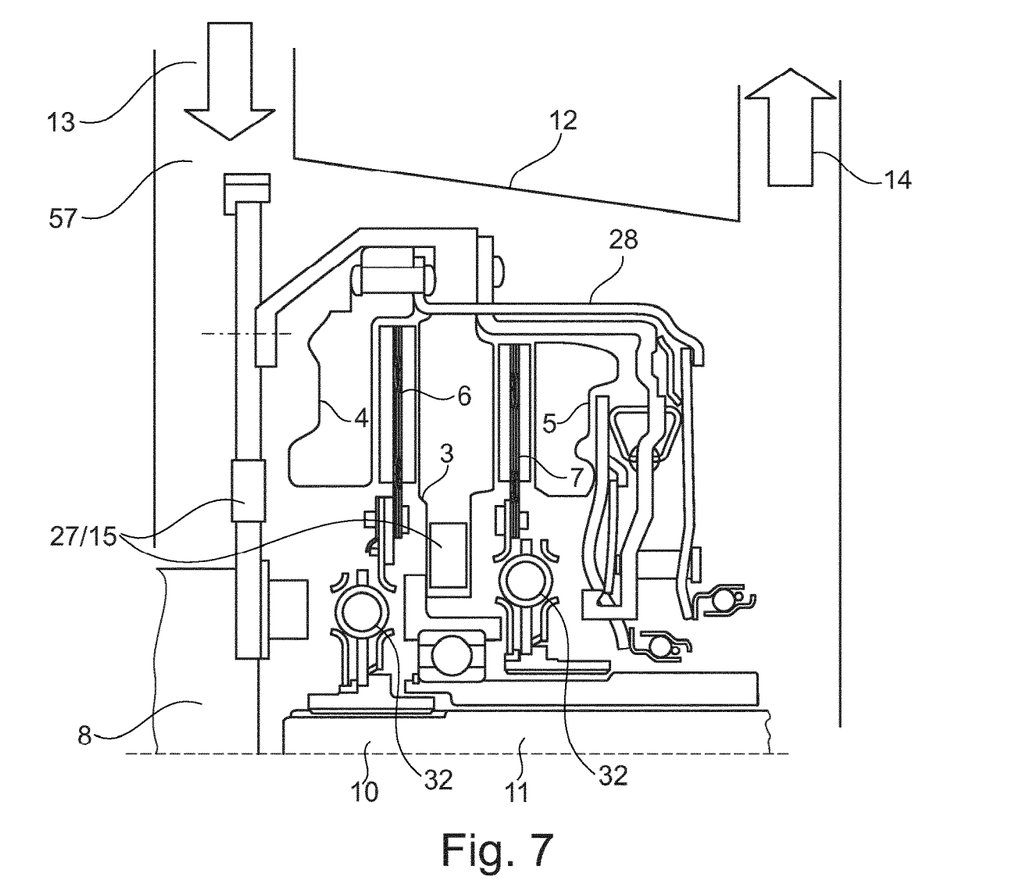
FIG. 7: shows the air passage system of the second illustrative embodiment of the dual clutch.

As shown in FIGS. 6 and 7, the entire dual clutch 1 shown in the drawing is surrounded by a clutch housing 12.

Figure 2:
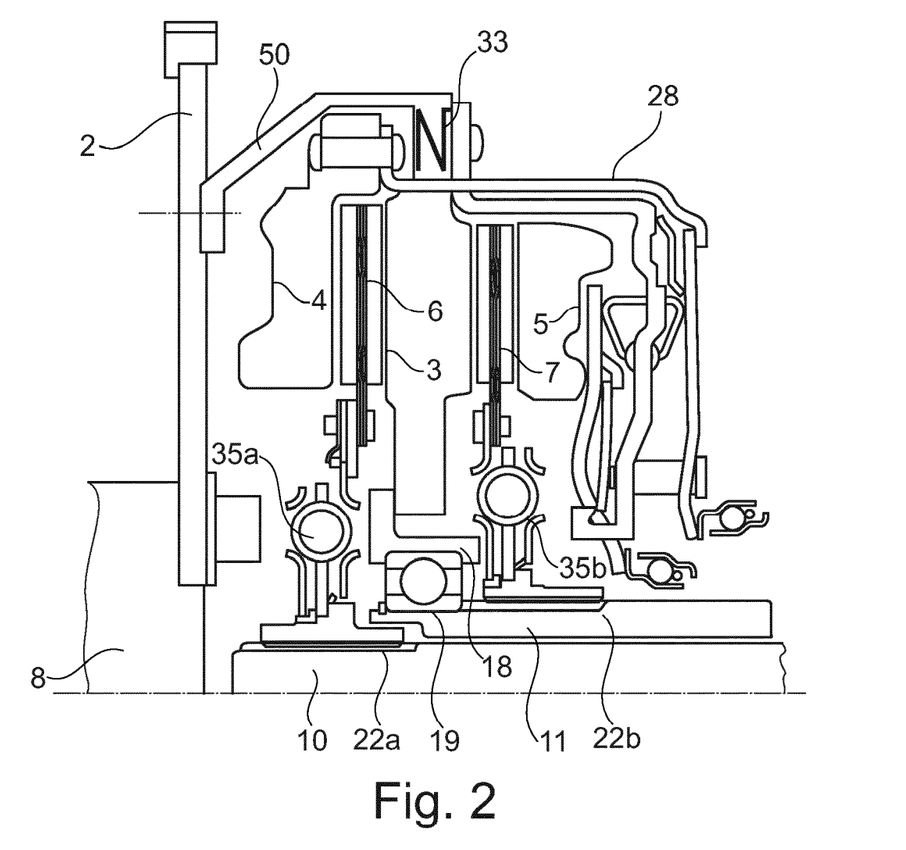
FIG. 2: shows the same section as FIG. 1 through a second illustrative embodiment of a dual clutch.

According to FIG. 2 of the drawing, the dual clutch 28 essentially comprises a driving disk 2, a central disk 3 connected thereto, contact pressure plates 4 and 5 provided on both sides of the central disk 3, and friction disks 6 and 7 arranged between the central disk 3 and the contact pressure plates 4 and 5.

The driving disk 2 is seated for conjoint rotation on the input shaft 8 of the dual clutch 28 and consequently rotates with the latter at the same speed of rotation. The input shaft 8 is normally the output shaft or crankshaft of an engine (not shown in the drawing).

In this illustrative embodiment, the driving disk 2 is connected to the central disk 3 via a clutch body 50 and a radial/axial spring system 33, i.e. the central disk 3 revolves at the same speed as the driving disk 2. The contact pressure plates 4 and 5 arranged on both sides of the central disk 3 revolve with the central disk 3 but can be moved axially relative to the central disk 3. In this case, the central disk 3 is supported radially in an axial direction by the hollow shaft bearing 19 and a cardanic thrust washer 18.

The central disk 3 and the contact pressure plates 4 and 5 are firmly connected to the driving disk 2 by a clutch body 50 and are supported in a radial direction in an axial direction by means of the cardanic thrust washer 18.

To initiate the clutch operation, one of the contact pressure plates 4 or 5 is moved in a direction toward the central disk 3, with the respective friction disk 6 or 7 being pressed firmly against the central disk 3.

Owing to the coupling of the respective friction disk 6 or 7, said disk rotates with the central disk 3 and transmits the torque of the engine to the respective output shaft 10 or 11 of the dual clutch 28 via damper systems 35*a* and 35*b*.

Output shaft 10, which is connected by splines 22*a* to friction disk 6, shown on the left in the drawing, is designed as a solid shaft, and issues into a transmission housing (not shown in the drawing), where it serves to drive a first transmission section. This transmission section operates gears 1, 3 and 5, for example.

Output shaft 11, which can be connected by splines 22*b* to friction disk 7, shown on the right in the drawing, is designed as a hollow shaft, which surrounds the solid shaft 10. The hollow shaft 11 likewise leads into the transmission housing (not shown in the drawing) and serves to drive a second transmission section, which is provided for gears 2, 4, 6 and R, for example.

The entire dual clutch 28 shown in the drawing is surrounded by a clutch housing 12, see FIGS. 6 and 7. The axial nonuniformities are compensated by a leaf spring system 33. Radial compensation is provided by the radial play between the central disk 3 and the cardanic thrust washer 18.

In the starting condition, in particular also in stop and go operation, in which the respective friction disk 6 or 7 makes frictional contact between the central disk 3 and the respective contact pressure plate 4 or 5, considerable frictional heat is generated, which must be dissipated: otherwise, there would be both severe wear on the friction disks 6 and 7 and odor generation. Moreover, the friction pairing at the surface is destroyed, which could lead to clutch fading or clutch grab and to high variance in the friction coefficient.

To cool the dual clutches 1 and 28, the clutch housing 12 is provided with an air inlet 13 and an air outlet 14, as illustrated in FIG. 6 and FIG. 7. In this case, the air inlet 13 is arranged in the region of the inlet side of the clutch housing 12, and the air outlet 14 is arranged on the outlet side of the clutch housing 12 of the dual clutches 1 and 28.

Figure 3:
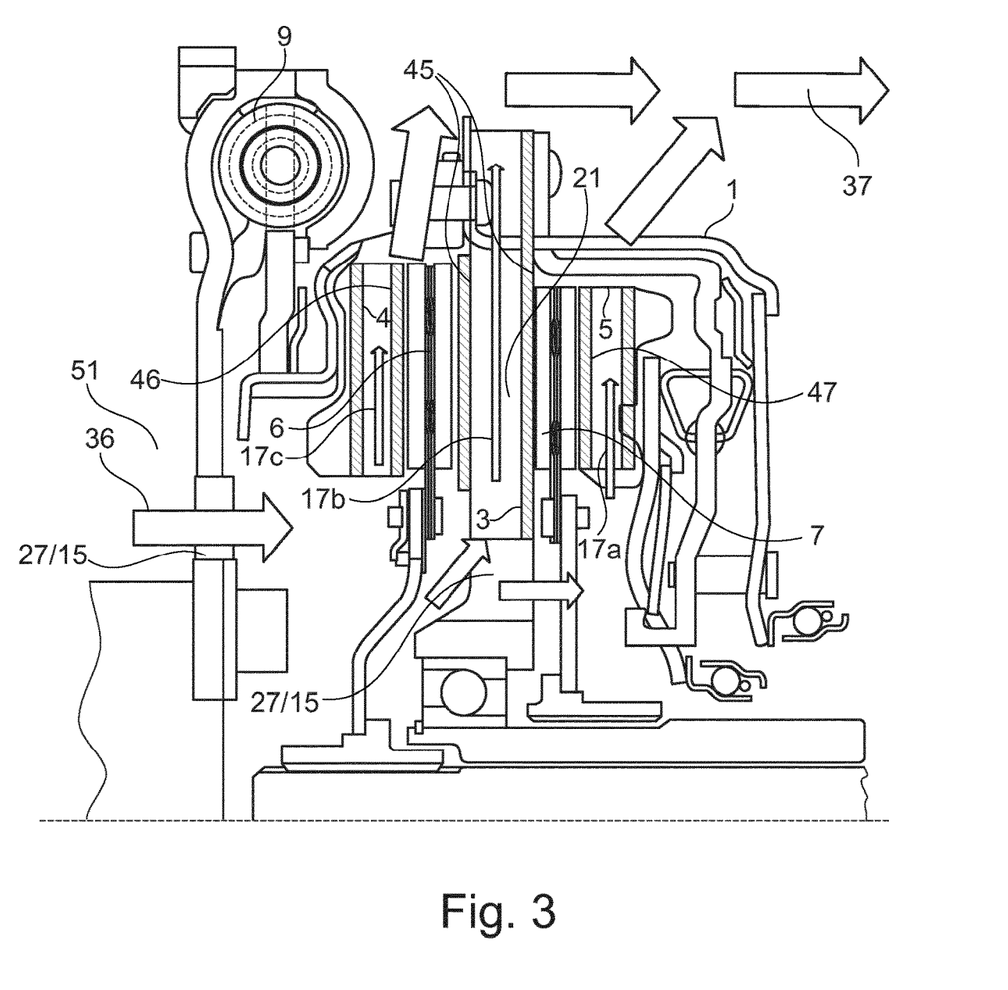
FIG. 3: shows the same section as FIG. 1 through the first illustrative embodiment of a dual clutch with an integrated fan impeller system as an inner cooling system.
Figure 4:
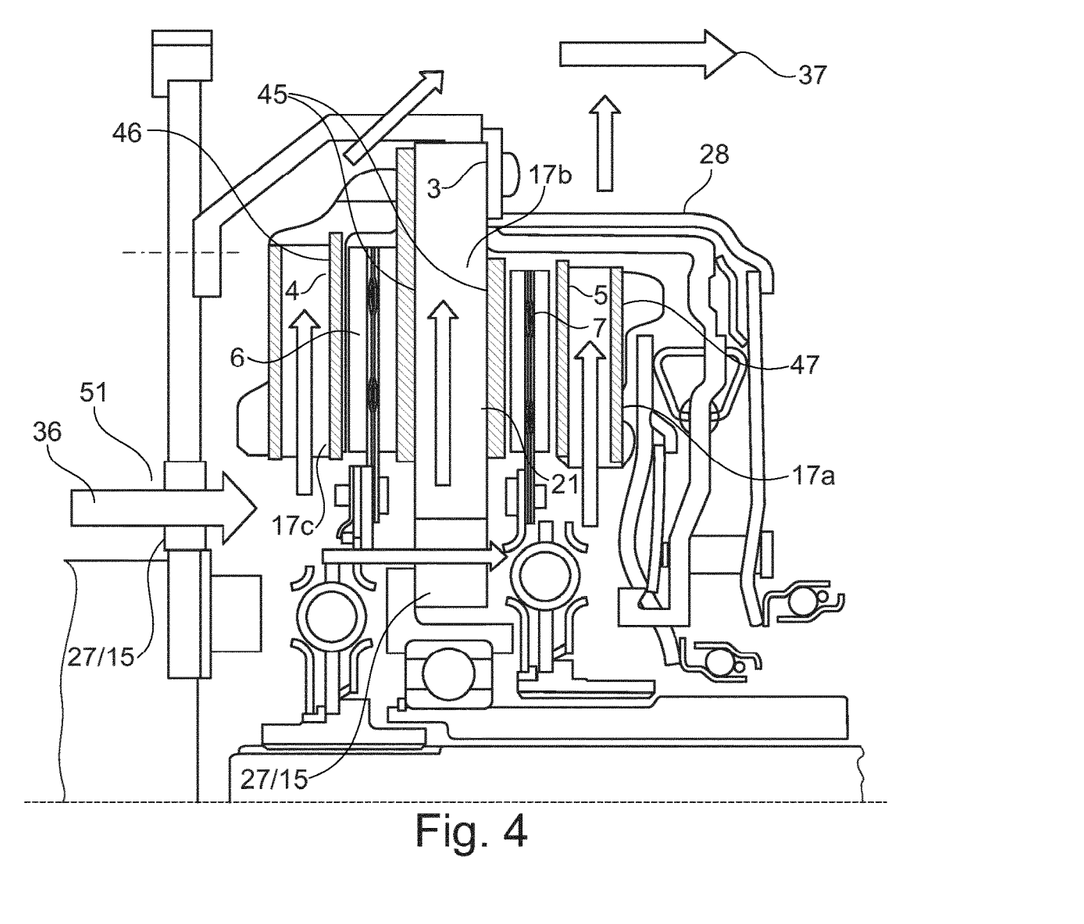
FIG. 4: shows the same section as FIG. 2 through the second illustrative embodiment of a dual clutch with an integrated fan impeller system as an inner cooling system.

To produce an intensive air flow through the clutch housing 12, up to three fan impeller systems 17*a*, 17*b* and 17*c* are provided within an overall ventilation system 21. As shown in FIG. 3 and FIG. 4, the ventilation system 21 is integrated into the central disk 3 and the respective contact pressure plates 4 and 5 for both embodiments of the dual clutch 1 and 28. Since the fan impeller systems 17*a* to 17*c* are embedded within the driven components, they rotate with the driving disk 2 and thus also with the input shaft 8 coming from the engine. The cooling air flow thus extends from the air flow inlet 36, via the separate air flows of fan impeller systems 17*a* to 17*c*, to the air flow outlet 37.

The ventilation system 21 comprises the fan impeller systems 17*a* to 17*c* and the corresponding contact pressure surfaces 45 of the central disk 3 and the contact pressure surfaces 46 and 47 of contact pressure plates 4 and 5, which are rigidly connected to the respective fan system. The central disk 3 and also the contact pressure plates 4 and 5, which form the fan systems, can be configured as an integral or non-integral adhesively bonded, screwed or riveted design.

In the two embodiments of the dual clutches 1 and 28, air passage openings 27 are furthermore provided in the driving disk 2 and/or in the central disk 3 in order to facilitate or indeed allow air to enter the three embedded fan impeller systems. Instead of the air passage openings, it is also possible optionally to provide additional fan impellers (integrated fan impeller system 15) in the overall fan system 21, either in the driving disk 2 and/or in the central disk 3, thus allowing the speed of flow of the cooling air and/or the cooling air throughput at the air flow inlet 36 to be increased.

In general, the heat transfer can be described as follows:

$$dT/dt = 1/(m*Cp)(QR*-QK*-QS*-QL*)$$

dT/dt=temperature gradient m=masses of the central disk 3 and/or of the contact pressure plates 4 and 5 (the masses must not fall below a minimum value to ensure that there is sufficient absorption of the frictional heat.)

Cp=heat capacity constant of the material of the central disk 3 and/or of the contact pressure plates 4 and 5 (depending on the material used)

QR*=frictional heat introduced

QK*=heat loss by convection (includes the heat transfer constant ALPHA) at the central disk 3 and/or at the contact pressure plates 4 and 5 and represents the inner cooling system 51

QS*=heat loss by radiation (enlargement of the areas of action for heat transfer to the cooling air flow) and represents the inner cooling system 51

QL*=heat loss via the conduction of adjacent systems and represents the outer cooling system 57, bringing about heat exchange between the clutch housing 12 and the environment directly or via the front radiator 24

From this consideration, it can be appreciated that three parameters can be varied. These three parameters are the masses and the heat loss by convection (QK*) and the heat loss by radiation (QS*).

All the other parameters are either predetermined by the clutch design and are thus invariable or an external cooling system must be created. However, the external cooling system alone has the decisive disadvantage that the friction surfaces cannot be reached and thus cannot be cooled in a targeted manner.

Known designs of dual dry clutch systems are designed as mass cooling systems with high masses and with a high thermal resistance. There is very little convection of the heat from the masses into the outer cooling system, and this is the decisive disadvantage of the mass cooling system.

With the design according to the invention, however, all the problems can be solved.

Figures 5, 5A, 5B, 5C:
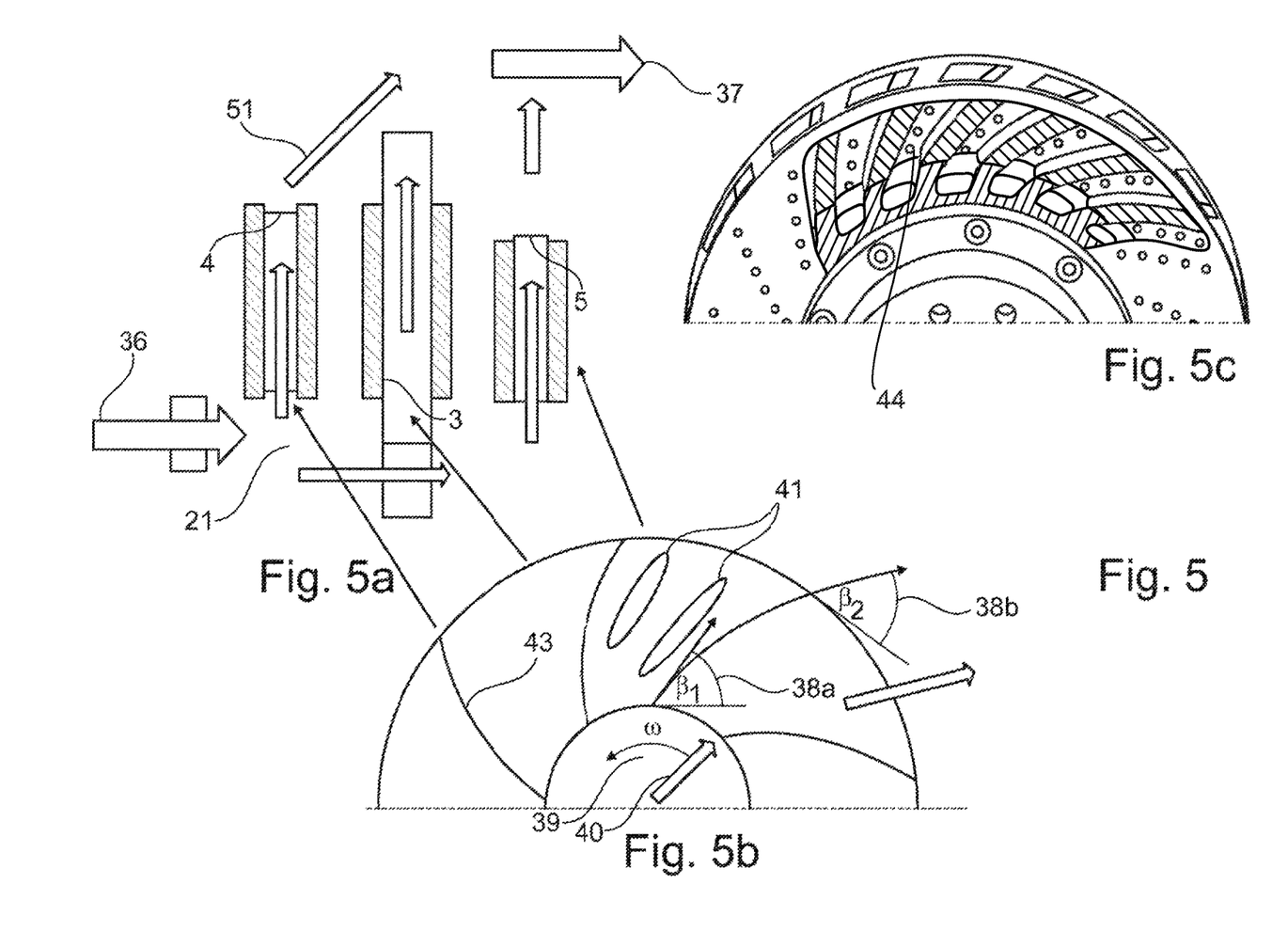
FIGS. 5a to 5c: show various embodiments of the integrated fan impeller system.

FIG. 5b shows the design of the fan impeller systems 17a to 17c. These comprise the fan blades 43 that are formed as the edges of internal passages extending radially through central disk 3 and pressure plates 4 and 5. The number of fan blades 43 can be selectively optimized, namely specifically for the central disk 3 and the respective contact pressure plates 4 and 5 individually. In this case, the entry angle beta 1 (38a) and the exit angle beta 2 (38b) determine the direction and speed (40) of the air flow. Here, the speed V of the air flow increases in proportion to the angular speed omega of the fan impeller.

FIG. 5b shows a cross section through the fan impeller systems 17a to 17c, more specifically as a detail of the overall fan system 21 shown in FIG. 5a. In order to increase the cooling area, additional cooling islands 41 can be inserted within a respective passage in order to increase the area of action, the convection and the heat radiation. FIG. 5c shows a portion of the outer frictional surface cut away to reveal some of the internal passages forming the internal fan blades of the impeller. It is furthermore possible, as shown in FIG. 5c, to introduce transverse cooling openings 44 in order to improve heat dissipation directly at the friction point. Transverse openings are shown from the internal passages to both planar surfaces of the disk/plate.

In FIG. 5a, only the fan impeller system itself is shown, the intention being to show that the fan impeller system can also be used in transmission systems with single clutch applications, e.g. in manually operated transmissions or also in automated shift transmissions.

In this design, the air flow 36, 37 produced by the fan impeller system 17a to 17c is matched to the speed of the input shaft 8, i.e. at a relatively high engine speed, at which the friction disks 6 and 7 may also be subject to more severe thermal stress, the air flow is likewise intensified. By means of this optimum active cooling of the dual clutch, the temperatures of the clutch system comprising the central disk 3, the contact pressure plates 4 and 5 and the friction disks 6 and 7 are considerably reduced, thereby not only reducing wear on the individual clutch components but also stabilizing the friction coefficient of the friction disks 6 and 7. By virtue of the stabilization of the friction coefficient of the friction disks 6 and 7, it is also possible to transmit a stable torque at all times with the same contact pressure force of the contact pressure plates 4 and 5. Moreover, odor generation is also very largely avoided. Furthermore, this solution allows very much quicker cooling in the closed clutch condition.

By virtue of the arrangement, according to the design, of the air inlet 13 and of the air outlet 14 at opposite ends of the clutch housing, very intensive air circulation through the entire dual clutch 1, 28 is possible. Owing to this extremely active air cooling and especially through the integration of the respective fan impeller system into (i.e., embedded within) the central disk 3 or into the contact pressure plates 4, 5, the volumes of the cast masses of the central disk 3 and of the contact pressure plates 4, 5 can also be reduced, thus to this extent making savings possible. At the same time, clutch losses are also reduced.

In order to be able to carry the cooling air flow 36, 37 through the driving disk 2 and the central disk 3 to the fan impeller systems 17a to 17c, the already mentioned air passage openings 27 are provided, through which the cooling air can be drawn in from the region of the outer cooling system 57 in front of the driving disk 2, said region being connected to the air inlet 13, and can be passed through the entire clutch to the air outlet 14 of the outer cooling system 57. This embodiment is shown, in particular, in FIGS. 6 and 7. Additional fan impeller systems, as described at the outset, can optionally be integrated into the driving disk 2 and/or into the central disk 3 instead of the air passage openings 27 and 15 in this illustrative embodiment too.

Figure 8:
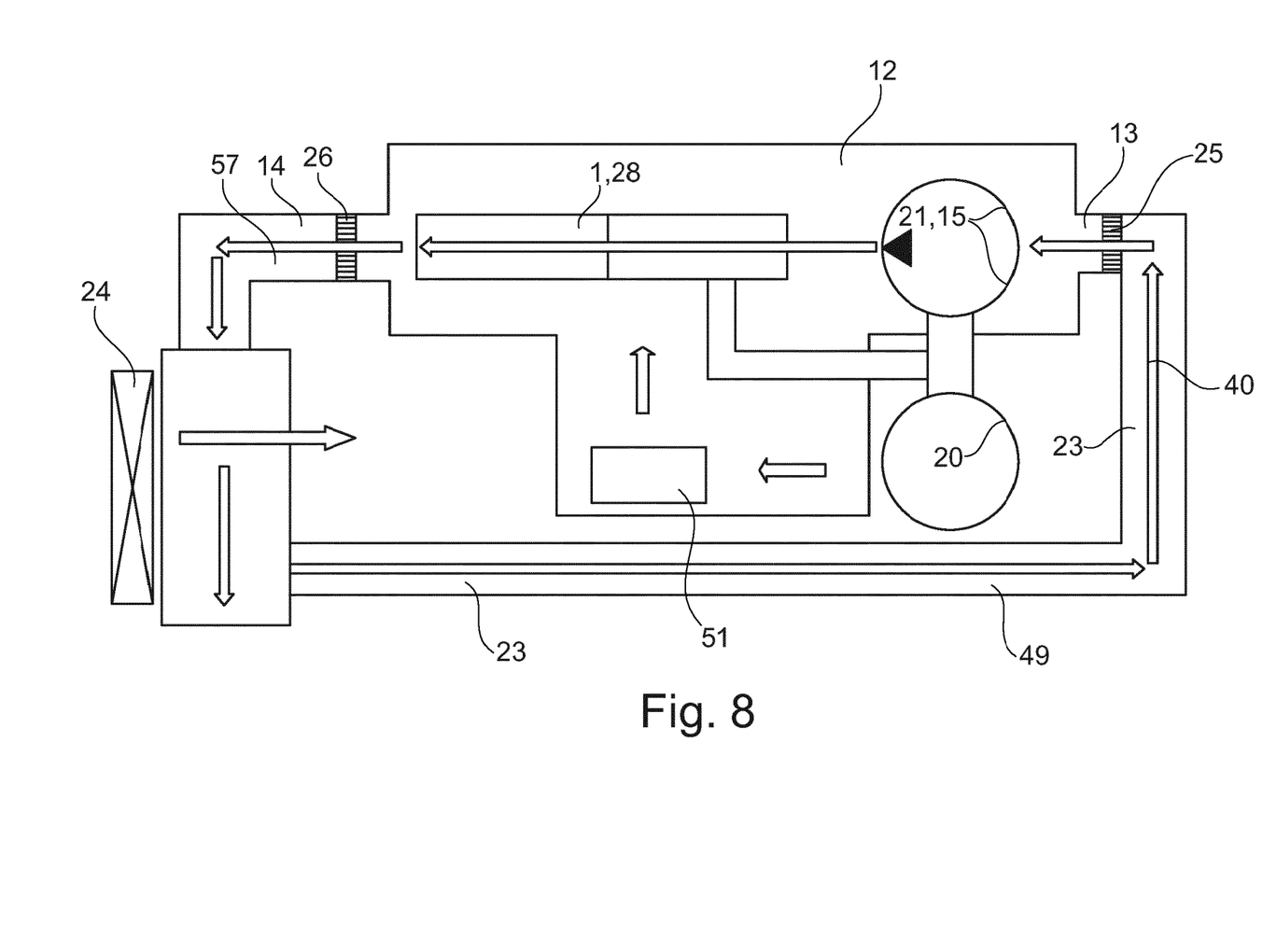
FIG. 8: shows a schematic overview of a first possibility for guiding the air flow outside the clutch system as an outer cooling system.

FIG. 8 shows a schematic representation of an illustrative embodiment of a possibility for guiding the cooling air flow by means of a mechanical drive, wherein the individual components are illustrated only schematically.

A fan impeller system 15 represented as a circle is driven by a motor 20. This fan impeller system 15 is arranged ahead of a dual clutch 1, 28. The cooling air flow 49 is passed through a conduit system 23, which starts from the front radiator 24 and is introduced into the clutch housing 12 through an inlet filter 25 arranged in the air inlet of the clutch housing 12 and thus forms the outer cooling system 57.

The fan impeller system 21 driven by the motor 20, said system also being represented in the circle, blows the cooling air 40 through both clutch sections of the dual clutch 1, 28. The cooling air flow 40 heated therein then passes into the clutch housing and finally back to the front radiator 24 through the air outlet 14 and an outlet filter 26 arranged in the air outlet 14 and thus forms the inner cooling system 51 with the fan impeller system 15, 21.

Figure 9:
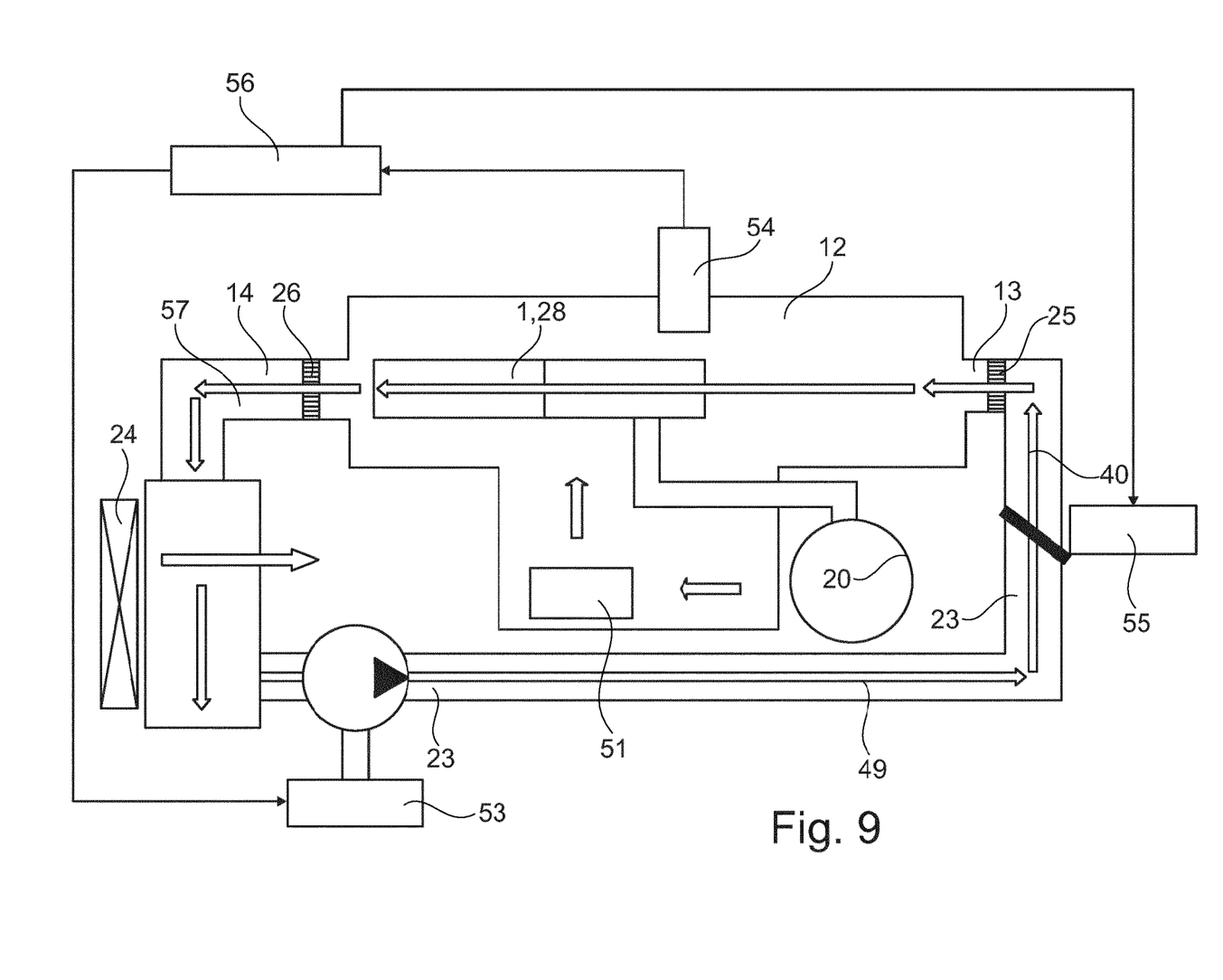
FIG. 9: shows a schematic overview of the air flow guidance system illustrated in 8a outside the clutch system as an outer cooling system with electronic closed-loop and/or open-loop control.

FIG. 9 shows schematically an illustrative embodiment of one possibility for the electronically controlled guidance of the individual cooling air flows. Here, the outer cooling system is designed as an electronically controlled system. The inner cooling system 51 remains mechanically as described in this application and carries the clutch heat produced into the clutch housing by means of the air flow. It is technically impossible here to integrate an electronically controlled cooling system.

One possibility for the embodiment of the electronic control, as an electronically controlled pump system 53 represented as a circle/pump, is driven by an electric motor and integrated with controlled by a control unit 56. This electric pump system is installed in the outer cooling system 57/conduit system 23. As in the mechanically controlled system in FIG. 8, the cooling air flow 49 is passed through a conduit system 23, which starts from the front radiator 24 and is introduced into the clutch housing 12 through an inlet filter 25 arranged in the air inlet of the clutch housing 12. The cooling air flow 49 is electronically controlled in accordance with the air temperature, which is measured by the temperature sensor 54, in the clutch housing. This control can also be accomplished in accordance with a clutch temperature model, which is integrated into the control unit 56, or in combination with a temperature sensor 54.

A second possibility for the embodiment of the electronic control system provides this embodiment electronic control of the air flow by means of an electrically adjustable air flap system 55, integrated into the conduit system 23. The air flow can then be combined in accordance with the air temperature, measured by means of the temperature sensor 54 in the clutch housing 54, either by means of an air flap control system in combination with a mechanically driven system as described in this application or with an electronically controlled pump system 53.

This manner of air routing ensures that the cooling air is free from water. It is furthermore ensured that the cooling air flowing through the clutch components remains clean by virtue of the filters 25 and 26, which are arranged in the air inlet 13 and the air outlet 14 of the clutch housing 12.

By means of the invention, an optimum active cooling system for a dry dual clutch is thus created, with the result that the performance capacity thereof can be increased, wear can be reduced and also the cast masses of various clutch disks can be reduced. Odor generation is thus also considerably reduced.

Figure 10:
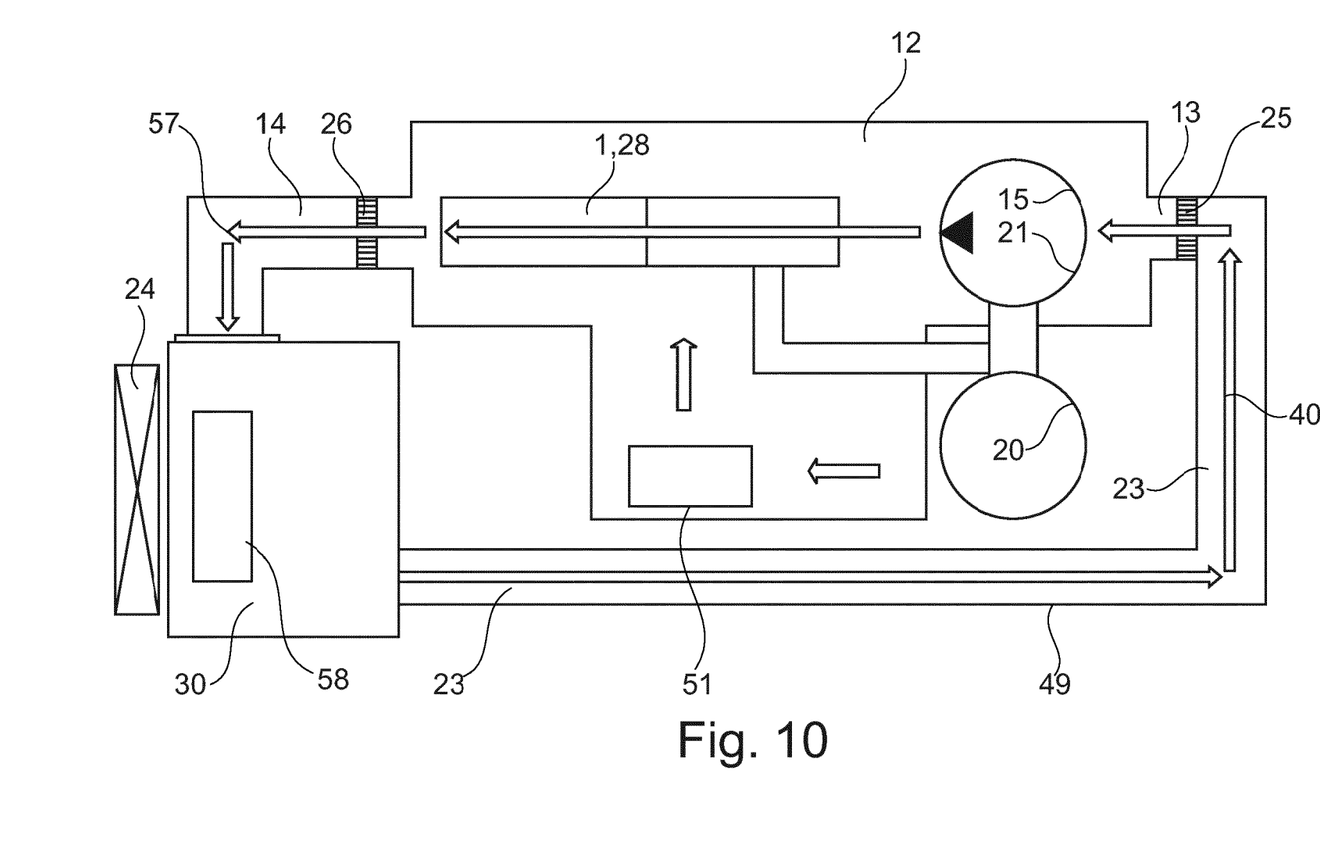
FIG. 10: shows a schematic overview of a second possibility for guiding the air flow outside the clutch system as an outer cooling system.

FIG. 10 shows the same cooling air flow circuit as in FIG. 8 and FIG. 9, although without a main radiator, with however the vehicle fan system 58, which is here integrated into the cooling circuit. In this first version, the clutch heat is exchanged with the environment at the front vehicle end 30 by means of the vehicle fan system 58.

As a second version, the vehicle fan system can also be installed as a pump in order to bring about the air flow 49 of the outer cooling system 57, whereby cooling of the clutch housing is accomplished by way of the environment.

In both versions, the vehicle fan system can optionally be subject to open-loop and/or closed-loop control by means of a measured clutch housing temperature or a calculated clutch temperature via a clutch temperature model.

Figure 11:
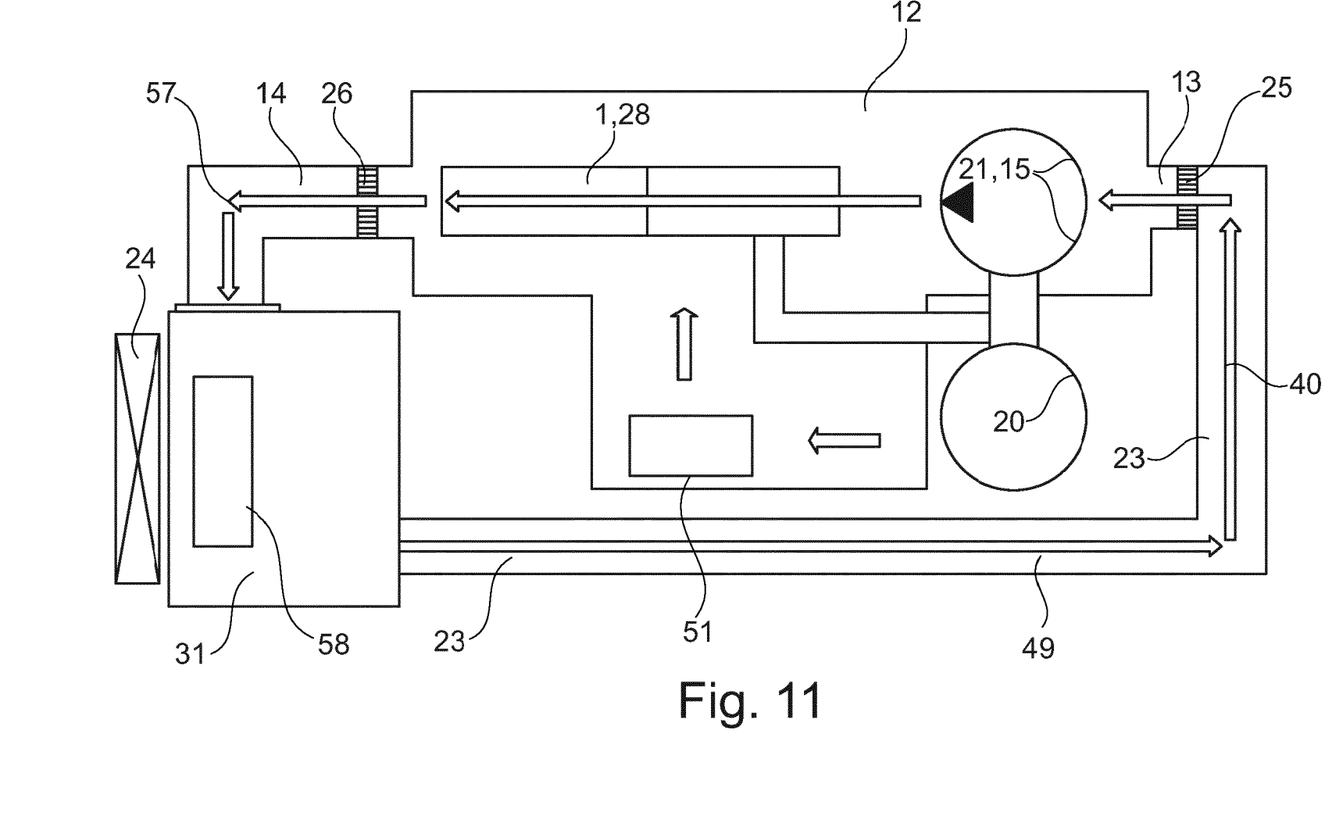
FIG. 11: shows a schematic overview of a third possibility for guiding the air flow outside the clutch system as an outer cooling system.

FIG. 11 shows the same cooling circuit as in FIG. 10 without a radiator, wherein heat exchange is performed in the engine zone 31. Here, the vehicle fan system can likewise optionally be subject to open-loop and/or closed-loop control by means of a measured clutch housing temperature or a calculated clutch temperature via a clutch temperature model in order to reduce the ambient temperature of the clutch or the resulting clutch housing/clutch input temperature.

The invention claimed is:

1. A dual clutch transmission system for motor vehicles, comprising:
   a transmission having two transmission sections; and
   a dry dual clutch transmitting a torque from an engine of the vehicle selectively to one of the two transmission sections, wherein the dual clutch is comprised of a central disk and a pair of pressure plates;
   wherein the dual clutch includes a cooling system comprised of an embedded fan impeller system for active air cooling of the dual clutch;
   wherein the fan impeller system is comprised of a plurality of internal passages formed in at least one of the central disk and the pressure plates.

2. The dual clutch transmission system of claim 1 wherein the internal passages extend at least partially radially within a respective central disk or pressure plate.

3. The dual clutch transmission system of claim 1 wherein the internal passages extend parallel to an outer frictional surface of a respective central disk or pressure plate.

4. The dual clutch transmission system of claim 1 wherein the internal passages are configured to provide internal fan blades having entry angles and exit angles to create a desired air flow speed and direction.

5. The dual clutch transmission system of claim 1 wherein the central disk and pressure plate having the internal passages is integrally formed as a homogeneous casting.

6. The dual clutch transmission system of claim 1 wherein cooling islands are provided within the internal passages in order to increase the cooling surface area.

7. The dual clutch transmission system of claim 1 wherein transverse cooling openings are formed between the internal passages and an outer frictional surface.

8. The dual clutch transmission system of claim 1 wherein the dual clutch includes a housing, and wherein the system further comprises:
   an outer cooling system that carries heat from the clutch housing into an external environment.

9. The dual clutch transmission system of claim 8 wherein the outer cooling system a fan connected mechanically to a driving disk of the dual clutch.

10. The dual clutch transmission system of claim 8 wherein the clutch housing includes an inlet region receiving a cooling air from the outer cooling system and an outlet region for returning a heated air to the outer cooling system, wherein the inlet region and the outlet region are is situated at opposite ends of the clutch housing.

11. The dual clutch transmission system of claim 10 wherein the inlet and outlet regions are connected by a conduit system to a front radiator of the vehicle.

12. The dual clutch transmission system of claim 10 further comprising an air filter arranged in at least one of the inlet region and the outlet region.

13. The dual clutch transmission system of claim 10 wherein the outer cooling system controls a cooling of the cooling air flow in accordance with a temperature of the clutch housing.

14. The dual clutch transmission system of claim 10 further comprising an adjustable air flap system to control the cooling of the cooling air flow.

\* \* \* \* \*